(12) United States Patent
Seifert et al.

(10) Patent No.: US 8,196,967 B2
(45) Date of Patent: Jun. 12, 2012

(54) IMPROVEMENTS TO HIGH PRESSURE FUEL FITTINGS

(75) Inventors: John R. Seifert, Howell, MI (US); Dewey M. Sims, Jr., Royal Oak, MI (US); Ragu S. Raghupathi, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 645 days.

(21) Appl. No.: 12/365,218

(22) Filed: Feb. 4, 2009

(65) Prior Publication Data

US 2010/0194096 A1    Aug. 5, 2010

(51) Int. Cl.
*F16L 27/04* (2006.01)
*F16L 27/073* (2006.01)

(52) U.S. Cl. .......... 285/14; 285/261; 285/263; 285/332; 285/332.1; 285/924

(58) Field of Classification Search .................. 285/13, 285/14, 261, 263, 271, 332, 332.1, 332.2, 285/386, 924, 389
See application file for complete search history.

(56) References Cited

U.S. PATENT DOCUMENTS

| | | | | |
|---|---|---|---|---|
| 717,882 A * | 1/1903 | Martin, Jr. | .................. | 285/271 |
| 840,324 A * | 1/1907 | Hawley | .................. | 285/266 |
| 900,533 A * | 10/1908 | Hawley | .................. | 285/13 |
| 1,187,642 A | 6/1916 | Milz | | |
| 1,346,523 A * | 7/1920 | Norwood | .................. | 285/271 |
| 2,564,938 A | 8/1951 | Warren | | |
| 2,649,314 A | 8/1953 | Richardson | | |
| 2,680,358 A | 6/1954 | Zublin | | |
| 2,726,881 A | 12/1955 | Howard | | |
| 2,931,672 A | 4/1960 | Merritt et al. | | |
| 3,361,450 A * | 1/1968 | Franck | .................. | 285/271 |
| 3,479,061 A * | 11/1969 | Smookler et al. | .............. | 285/94 |
| 3,712,645 A * | 1/1973 | Herter | .................. | 285/95 |
| 4,012,060 A * | 3/1977 | Reneau | .................. | 285/93 |
| 4,767,142 A | 8/1988 | Takahashi et al. | | |

(Continued)

FOREIGN PATENT DOCUMENTS

DE    4407306    9/1995

OTHER PUBLICATIONS

Third Party Submission in corresponding Japanese Patent Application No. 2009-275097 dated Jul. 5, 2011.

*Primary Examiner* — James Hewitt
(74) *Attorney, Agent, or Firm* — Michael Best & Friedrich LLP

(57) ABSTRACT

A fitting for making a metal-to-metal fluid seal between a first conduit and a second conduit and corresponding first and second fluid passages. The first conduit has a generally spherical-shaped exterior surface, and the second conduit has a generally conical-shaped interior surface for receiving the generally spherical-shaped exterior surface of the first conduit. A nut is engaged with a threaded exterior surface of the second conduit, tightening of the nut on the threaded exterior surface urging the first and second conduits axially together to apply increasing pressure. A ring can be positioned between the nut and the first conduit, the ring providing a lower net coefficient of friction during tightening of the nut compared to direct contact between the nut and first conduit. The ring can be radially spaced from a radially facing interior surface of the nut.

4 Claims, 4 Drawing Sheets

U.S. PATENT DOCUMENTS

| | | |
|---|---|---|
| 4,776,615 A | 10/1988 | Young |
| 5,658,022 A | 8/1997 | Shi et al. |
| 5,975,490 A | 11/1999 | Essman |
| 5,975,588 A * | 11/1999 | Hesseln et al. .................. 285/89 |
| 6,045,162 A * | 4/2000 | Haibara .......................... 285/55 |
| 6,123,268 A | 9/2000 | Chastine |
| 6,158,781 A | 12/2000 | Aaron, III |
| 6,374,806 B1 | 4/2002 | Keeley et al. |
| 6,497,220 B1 | 12/2002 | Boecking |
| 6,595,558 B2 * | 7/2003 | Kusanagi ...................... 285/382 |
| 6,705,647 B1 | 3/2004 | Palmer |
| 6,746,056 B2 | 6/2004 | Palmer |
| 6,843,275 B2 * | 1/2005 | Kato ............................. 138/109 |
| 7,735,473 B2 * | 6/2010 | Kato et al. .................... 123/468 |
| 2003/0189337 A1 | 10/2003 | Palmer |
| 2006/0163873 A1 * | 7/2006 | Langhuber et al. ........... 285/386 |
| 2006/0284421 A1 | 12/2006 | Fonville et al. |

\* cited by examiner

IMPROVEMENTS TO HIGH PRESSURE FUEL FITTINGS

BACKGROUND

The present invention relates to fittings for high pressure fuel lines, particularly fittings that make fluid seals with metal-to-metal contact and allow for a limited amount of axial misalignment between first and second fuel conduits coupled by the fitting.

SUMMARY

In one embodiment, the invention provides a fitting for making a metal-to-metal fluid seal between a first conduit and a second conduit, the fitting including a first conduit defining a first fluid passage, the first conduit having a generally spherical-shaped exterior surface at a first end thereof. A second conduit defines a second fluid passage, the second conduit having a generally conical-shaped interior surface for receiving the generally spherical-shaped exterior surface of the first conduit. The second conduit includes a threaded exterior surface. A nut is engaged with the threaded exterior surface of the second conduit, tightening of the nut on the threaded exterior surface urging the first and second conduits axially together to apply increasing pressure between the generally spherical-shaped exterior surface and the generally conical-shaped interior surface. A ring is positioned between the first conduit and the nut, the ring having a radially facing outer surface that is radially spaced a distance from a radially facing inner surface of the nut.

In another embodiment, the invention provides a fitting for making a metal-to-metal fluid seal between a first conduit and a second conduit, the fitting including a first conduit defining a first fluid passage, the first conduit having a generally spherical-shaped exterior surface at a first end thereof. A second conduit defines a second fluid passage, the second conduit having a generally conical-shaped interior surface for receiving the generally spherical-shaped exterior surface of the first conduit. The second conduit includes a threaded exterior surface. A nut is engaged with the threaded exterior surface of the second conduit, tightening of the nut on the threaded exterior surface urging the first and second conduits axially together to apply increasing pressure between the generally spherical-shaped exterior surface and the generally conical-shaped interior surface. The generally spherical-shaped exterior of the first conduit includes a first portion contacting the generally conical-shaped surface and a second portion to which axial load from the nut is transferred, the first portion having a smaller radius than the second portion.

In another embodiment, the invention provides a method of manufacturing a ball and cone fluid fitting. A first conduit is provided with a generally spherical-shaped exterior surface. A second conduit is provided with a generally conical-shaped interior surface. The generally conical-shaped surface is coined with a master ball to create a seating surface for the generally spherical-shaped exterior surface of the first conduit. At least a portion of the generally spherical-shaped exterior surface is coated with a softer metal.

In another embodiment, the invention provides a fitting for making a metal-to-metal fluid seal between a first conduit and a second conduit, the fitting including a first conduit formed with a generally spherical-shaped exterior surface that includes a first portion and a second portion axially spaced from each other. A second conduit is formed with a generally conical-shaped interior surface that is engageable with the first portion of the generally spherical-shaped exterior surface to fluidly seal the first and second conduits. A nut is threaded into engagement with the second conduit and configured to apply pressure to the second portion of the generally spherical-shaped exterior surface to axially urge the first conduit and the second conduit together. A ring is positioned between the nut and the second portion of the generally spherical-shaped exterior surface, the ring providing a lower net coefficient of friction between the nut and the first conduit during rotation of the nut relative to the first conduit compared to direct contact between the nut and the first conduit.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
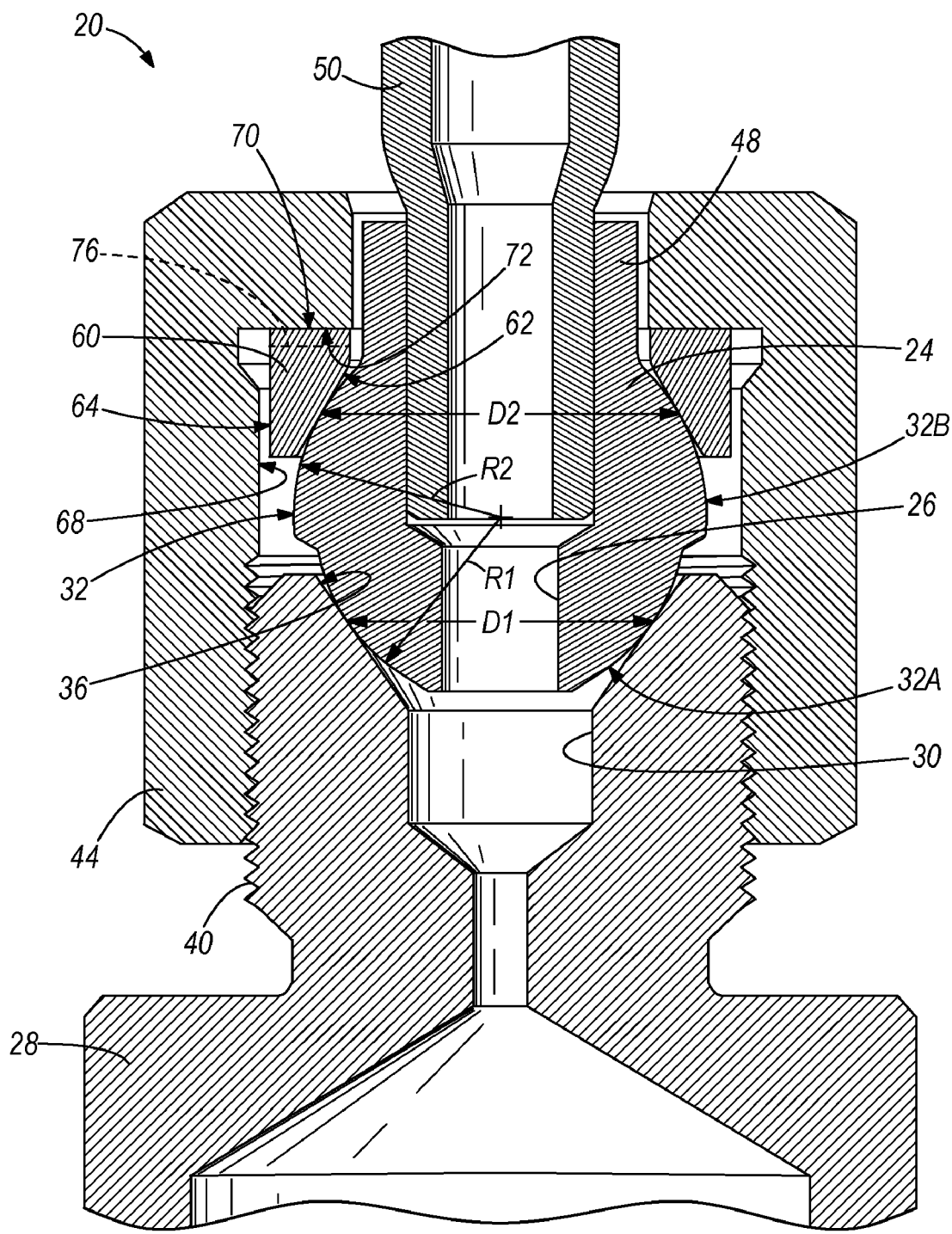
FIG. 1 is a cross-sectional view of a fitting according to one embodiment of the present invention.

FIG. 1 illustrates a fitting 20 including a first conduit 24 defining a first generally axial fluid passage 26 and a second conduit 28 defining a second generally axial fluid passage 30. The first and second conduits 24, 28 are coupled as described in further detail below to establish fluid communication between the respective fluid passages 26, 30. The fitting 20 is generally described as a ball and cone type fitting, which can be used in a high pressure fuel system in which the first conduit 24 and the second conduit 28 may or may not be in axial alignment. The first and second conduits 24, 28 are in direct contact with each other to establish a fluid seal therebetween via metal-to-metal contact without any intermediate sealing members (e.g., elastomeric rings). Specifically, the first conduit 24 includes a generally spherical-shaped exterior surface 32 that is received by a generally conical-shaped interior surface 36 of the second conduit 28. The interface between the exterior surface 32 of the first conduit 24 and the interior surface 36 of the second conduit 28 enables the first conduit 24 and the second conduit 28 to be coupled in variable different relative orientations.

The second conduit 28 includes a threaded exterior surface 40. A nut 44 at least partially encloses the first conduit 24 and is threaded onto the second conduit 28. Tightening of the nut 44 on the threaded exterior surface 40 urges the first and second conduits 24, 28 axially together to apply increasing pressure between the generally spherical-shaped exterior surface 32 and the generally conical-shaped interior surface 36. Greater torque applied to the nut 44 generally results in a higher axial sealing force and sealing pressure between the exterior surface 32 of the first conduit 24 and the interior surface 36 of the second conduit 28.

The generally spherical-shaped exterior surface 32 of the first conduit 24 constitutes a "ball portion" of the first conduit 24 and includes a first portion 32A and a second portion 32B. The first portion 32A contacts the generally conical-shaped interior surface 36. Axial load from the nut 44 is received by the second portion 32B. In addition to the ball portion, the first conduit 24 also includes a generally cylindrical stem portion 48 extending generally axially from the ball portion. The end of a fuel line 50 is at least partially received and supported by the stem portion 48. The first portion 32A has a radius R1 that is smaller than a radius R2 of the second portion 32B. In the illustrated construction, the first and second portions 32A, 32B have a common center point.

The contact between the first portion 32A and the interior surface 36 of the second conduit 28 is generally line-type contact in a ring shape having a diameter DI as shown in FIG. 1. The second portion 32B of the exterior surface 32 also engages in generally line-type contact in a ring shape through which axial load from the nut 44 is applied to the first conduit 24. The diameter D2 of the contact ring around the second portion 32B is larger than the diameter DI of the contact ring around the first portion 32A. Thus, for any given axial load, a greater pressure is exerted at the sealing interface between the first conduit 24 and the second conduit 28 compared to what is exerted between the nut 44 and the first conduit 24.

As shown in FIG. 1, a ring 60 is disposed between the nut 44 and the first conduit 24 to transfer load therebetween. The ring 60 is substantially coaxial with both the nut 44 and the first conduit 24. In the illustrated construction, the ring 60 is a tapered ring having a tapered interior surface 62 and a substantially flat radially facing exterior surface 64. The ring 60 may be constructed of high strength steel. The exterior surface 64 of the ring 60 is radially spaced a distance from a radially facing inner surface 68 of the nut 44. The ring 60 further includes an axially facing surface 70 contacting an internal axially facing surface 72 of the nut 44.

As the nut 44 is tightened onto the second conduit 28, a ring load is generated at the interface between the ring 60 and the first conduit 24. The ring load includes a normal component directed perpendicular to the tapered interior surface 62 at any given circumferential location and frictional component directed parallel to the tapered interior surface 62 at any given circumferential location. Axial loading of the ring 60 by the nut 44 results in a reaction force exerted on the tapered interior surface 62 of the ring 60 from the exterior surface 32 of the first conduit 24 that has a substantial component acting radially outward. Because the radially exterior surface 64 of the ring 60 is spaced from the radial surface 68 of the nut 44, the radially outward reaction force on the ring 60 is borne by the ring 60. Substantially no radial loads are transferred between the nut 44 and the ring 60. Thus, the nut 44 is not subjected to any radially outward loading when the nut 44 is tightened onto the second conduit 28. If applied, such loads act to try to split open the nut 44, which can occur depending upon material strength and the amount of torque applied. The ring 60 prevents any splitting-apart type loading of the nut 44.

As illustrated in FIG. 1, the fitting 20 may be further provided with a dedicated "leak path" for simplification of leak detection. The leak path does not promote leakage from inside the fluid passages 26, 30 but rather, is configured to direct fluid that is inside the fitting 20 (e.g., inside the nut 44) but outside the first and second conduits 24, 28 and the associated fluid passages 26, 30 to a predetermined location in the event that a leak does exist between the exterior surface 32 of the first conduit 24 and the interior surface 36 of the second conduit 28. In the illustrated embodiment, the ring 60 includes a recess or groove 76 formed adjacent the axially facing surface 70. The groove 76 allows fluid to flow from a location between the ring 60 and the nut 44 to a location outside of the fitting 20. Therefore, leak detection can be performed by sensing for the leak at a single, known location of the fitting 20, which makes leak detection quicker and less susceptible to error. In a fuel system for example, a small leak may result in only fuel vapor, and not liquid, escaping the fitting 20, which may be difficult to detect if the potential location of the vapor discharge is not known.

A further feature of the ring 60 is that it may enable a reduction in friction and correspondingly less torque required to be applied to the nut 44 to seal the first and second conduits 24, 28 to each other. The net coefficient of friction that exists in the fitting 20 between the nut 44 and the first conduit 24 is influenced by the respective interfaces between the ring 60 and both the nut 44 and the first conduit 24. In a conventional fitting, the nut contacts the first conduit directly. In the illustrated construction, the ring 60 is configured to offer a lower net coefficient of friction between the nut 44 and the first conduit 24, compared to direct contact between the nut 44 and the first conduit 24. The effect of the reduced friction coefficient is an actual reduction in friction when the nut 44 is being tightened onto the second conduit 28. Therefore, the torque required to be applied to the nut 44 to achieve a particular axial sealing force is reduced. Alternately, a greater axial sealing force can be achieved with a given amount of torque applied to the nut 44.

Figure 2:
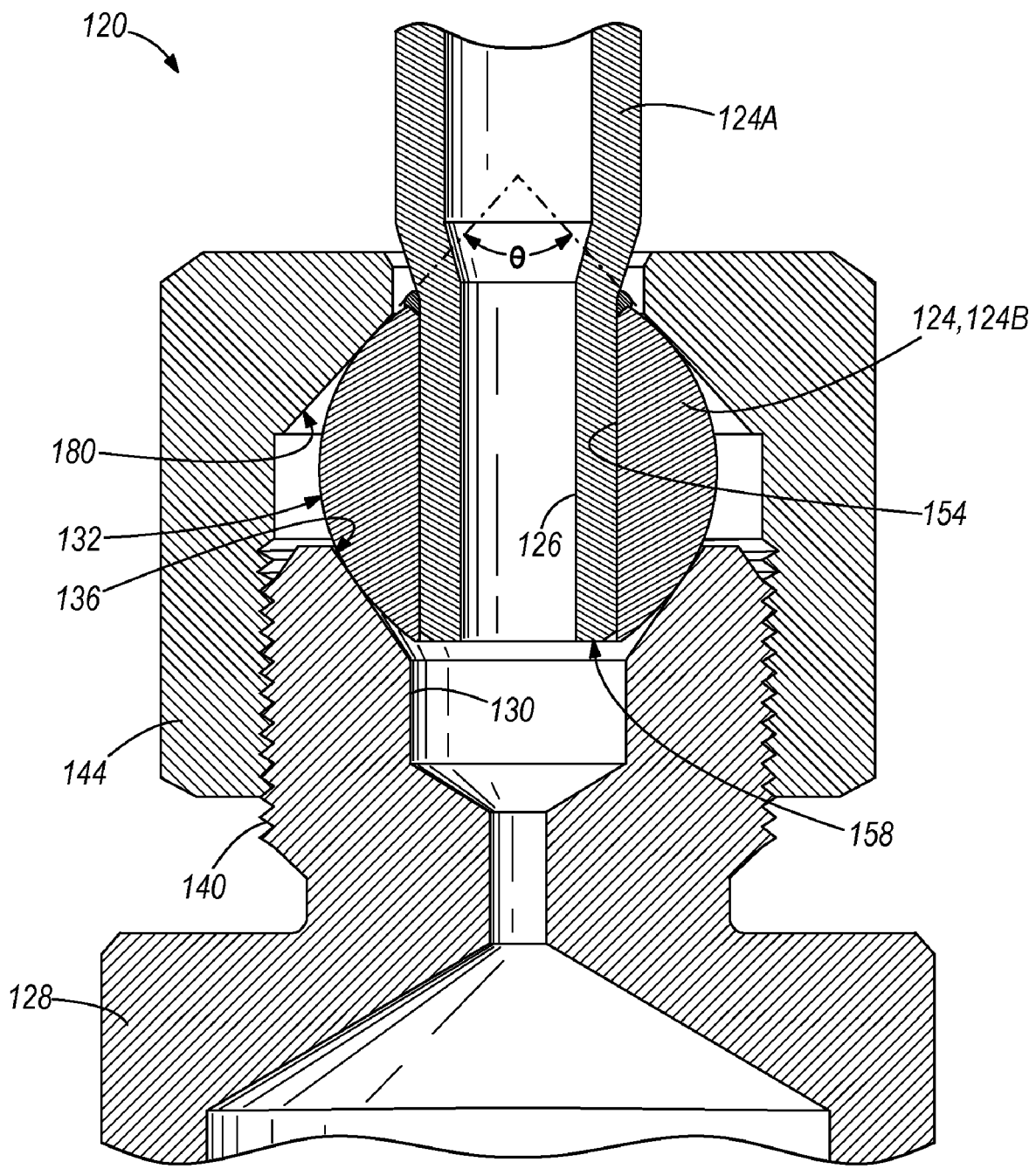
FIG. 2 is a cross-sectional view of a fitting according to another embodiment of the present invention.

FIG. 2 illustrates a fitting 120 including a first conduit 124 defining a first generally axial fluid passage 126 and a second conduit 128 defining a second generally axial fluid passage 130. The first and second conduits 124, 128 are coupled as described in further detail below to establish fluid communication between the respective fluid passages 126, 130. The fitting 120 is generally described as a ball and cone type fitting, which can be used in a high pressure fuel system in which the first conduit 124 and the second conduit 128 may or may not be in axial alignment. The first and second conduits 124, 128 are in direct contact with each other to establish a fluid seal therebetween via metal-to-metal contact without any intermediate sealing members (e.g., elastomeric rings). Specifically, the first conduit 124 includes a generally spherical-shaped exterior surface 132 that is received by a generally conical-shaped interior surface 136 of the second conduit 128. The interface between the exterior surface 132 of the first conduit 124 and the interior surface 136 of the second conduit 128 enables the first conduit 124 and the second conduit 128 to be coupled in variable different relative orientations.

Similar to the fitting 20 of FIG. 1, the second conduit 128 of FIG. 2 includes a threaded exterior surface 140. A nut 144 at least partially encloses the first conduit 124 and is threaded onto the second conduit 128. Tightening of the nut 144 on the threaded exterior surface 140 urges the first and second conduits 124, 128 axially together to apply increasing pressure between the generally spherical-shaped exterior surface 132 and the generally conical-shaped interior surface 136 in the same way as the nut 44 of the fitting 20 of FIG. 1. Unlike the fitting 20 of FIG. 1, the first conduit 124 of FIG. 2 is formed with the generally spherical-shaped exterior surface 132 having a single, constant radius.

Furthermore, the first conduit 124 includes a stem portion 124A and a ball portion 124B. In the illustrated construction, the stem portion 124A is a tubular fuel line, but it may alternately be configured to receive and support a tubular fuel line. The stem portion 124A and the ball portion 124B can be joined together by a copper braze or other suitable means for physically and sealingly connecting them together. The stem portion 124A and the ball portion 124B are manufactured or prefabricated separately from each other, the ball portion 124B being prefabricated without any portion protruding axially beyond the extent of the generally spherical-shaped surface 132 (e.g., no integrated stem portion). Thus, the ball portion 124B need not be manufactured on a lathe and can be manufactured from spherical stock rather than cylindrical stock. This allows the exterior surface 132, which is used for sealing, to be manufactured with a better surface finish as discussed in further detail below.

In one construction, the ball portion 124B is manufactured from a ball bearing. The ball bearing can have a surface finish about 50 times better than a lathe-produced ball portion and a roundness about 25 times better. Furthermore, the diameter tolerance for the ball bearing type ball portion 124B can be about 20 times better than a lathe-produced ball portion. In one construction, the prefabricated ball portion 124B can have a surface finish of about 0.05 micron, a roundness of about 0.0006 millimeter, and a diameter tolerance of about 0.0012 millimeter. The ball portion 124B also has a full-length opening 154 such that the stem portion 124A can extend to a common terminal end 158. Conventionally, the end of a fuel line is abutted against an internal chamfer in the ball portion, which can hinder the escape of air necessary for the brazing process.

Because the ball portion 124B is not formed with an integral axially-extending stem portion, the location where the tapered surface 180 of the nut 144 contacts the exterior surface 132 can be moved axially further toward the end of the ball portion 124B. The result is that the contact angle (i.e., the angle of the tapered surface 180) can be substantially increased over that of a conventional fitting. For example, the angle of the tapered surface 180 can be about 80 degrees, whereas a conventional fitting has about a 60 degree contact angle. Therefore, the torque required to be applied to the nut 144 to achieve a particular axial sealing force between the first and second conduits 124, 128 is reduced. The normal force between the tapered surface 180 and the exterior surface 132 to achieve a particular axial sealing force is also reduced as the direction of the normal force is closer to the axial direction. For example, the normal force may be less than 80 percent (e.g., about 77.8 percent) of the normal force required for a 60 degree contact angle. This reduces the severity of the nut 144 galling into the ball portion 124B. Alternately, if the full amount of torque is applied to the nut 144, a greater axial sealing force can be achieved. Furthermore, the lack of an integral axially-extending stem portion reduces the axial length of the illustrated ball portion 124B, reducing the potential bending load on the stem portion 124A. Thus, the possible fatigue failure is reduced by using the ball bearing type ball portion 124B compared to a ball-stem component, which can apply a high bending load to a fuel line at the terminal end of the stem portion.

Although not illustrated, a ring may be positioned between the nut 144 and the exterior surface 132 of the first conduit 124 similar to the ring 60 of the fitting 20 of FIG. 1. However, the fitting 120 of FIG. 2 also provides an alternate mechanism of reducing the "splitting-apart" type loading by reducing the amount of radial loading on the nut 144 for a given torque applied between the nut 144 and the first conduit 124.

Additional improvements in the fitting 120 of FIG. 2 can include coining the generally conical-shaped interior surface 136 (e.g., with a master ball) to create a seating surface for the generally spherical-shaped exterior surface 132 of the first conduit 124. The master ball is a high quality ball bearing having the shape of the generally spherical-shaped exterior surface 132, but having tighter tolerances and a better surface finish. The master ball is adapted to be part of the hammer of a coining press. The coining operation creates a very small spherical-shaped impression in the generally conical-shaped interior surface 136, into which the ball portion 124B can be seated without a great amount of torque applied to the nut 144 during final assembly of the fitting 120. Furthermore, at least a portion of the generally spherical-shaped exterior surface 132 can be coated with a softer metal (e.g., copper electroplating), which can reduce the surface roughness of the coated portion by about 50 percent. The coating may have a thickness less than about 0.001 inch, such as a thickness of about 0.0005 inch.

Figure 3:
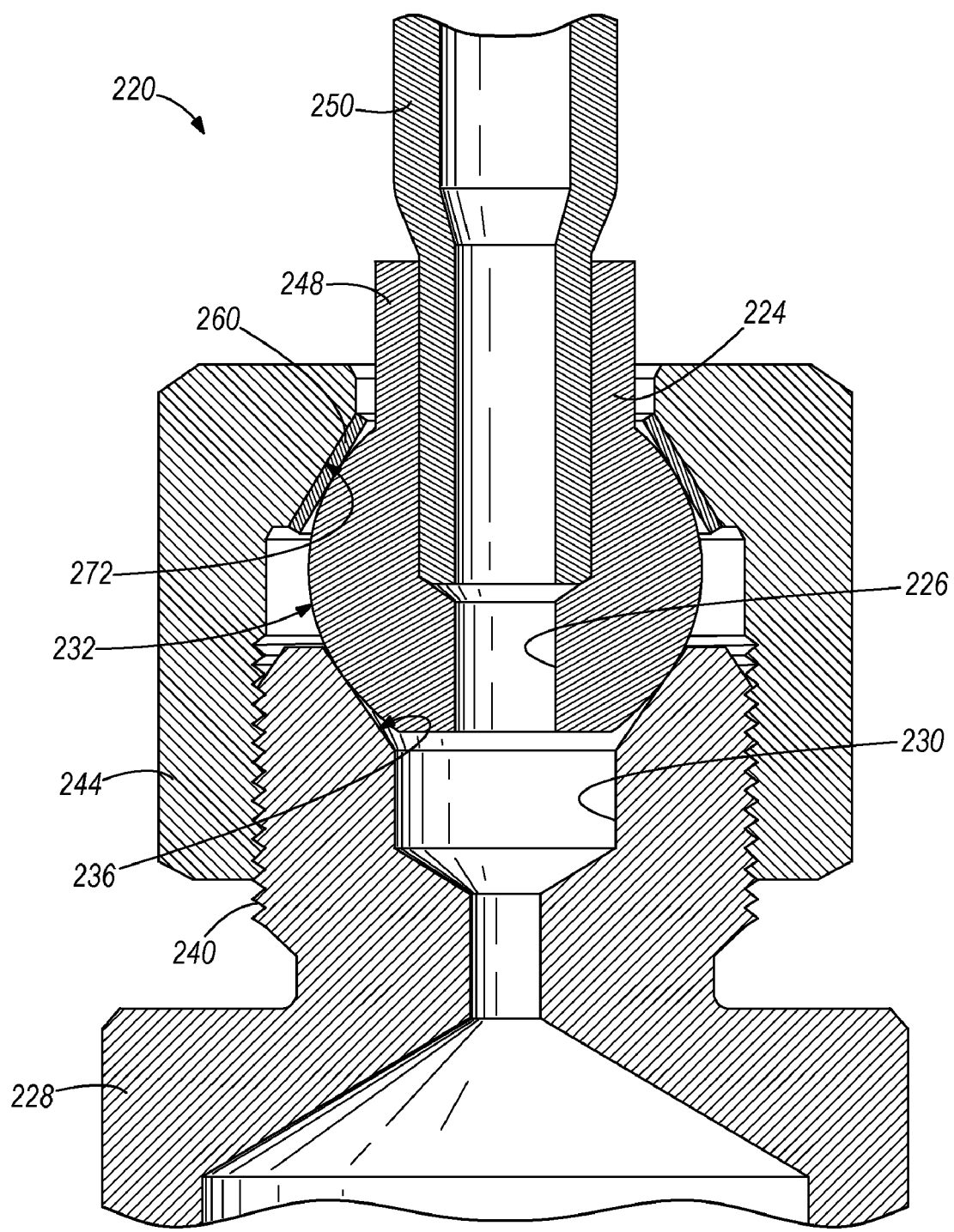
FIG. 3 is a cross-sectional view of a fitting according to yet another embodiment of the present invention.

FIG. 3 illustrates a fitting 220 including a first conduit 224 defining a first generally axial fluid passage 226 and a second conduit 228 defining a second generally axial fluid passage 230. The first and second conduits 224, 228 are coupled as described in further detail below to establish fluid communication between the respective fluid passages 226, 230. The fitting 220 is generally described as a ball and cone type fitting, which can be used in a high pressure fuel system in which the first conduit 224 and the second conduit 228 may or may not be in axial alignment. The first and second conduits 224, 228 are in direct contact with each other to establish a fluid seal therebetween via metal-to-metal contact without any intermediate sealing members (e.g., elastomeric rings). Specifically, the first conduit 224 includes a generally spherical-shaped exterior surface 232 that is received by a generally conical-shaped interior surface 236 of the second conduit 228. The interface between the exterior surface 232 of the first conduit 224 and the interior surface 236 of the second conduit 228 enables the first conduit 224 and the second conduit 228 to be coupled in variable different relative orientations.

The second conduit 228 includes a threaded exterior surface 240. A nut 244 at least partially encloses the first conduit 224 and is threaded onto the second conduit 228. Tightening of the nut 244 on the threaded exterior surface 240 urges the first and second conduits 224, 228 axially together to apply increasing pressure between the generally spherical-shaped exterior surface 232 and the generally conical-shaped interior surface 236. Greater torque applied to the nut 244 generally results in a higher axial sealing force and sealing pressure between the exterior surface 232 of the first conduit 224 and the interior surface 236 of the second conduit 228.

The generally spherical-shaped exterior surface 232 of the first conduit 224 constitutes a "ball portion" of the first conduit 224, which is compressed between the nut 244 and the second conduit 228. In addition to the ball portion, the first conduit 224 also includes a generally cylindrical stem portion 248 extending generally axially from the ball portion. The end of a fuel line 250 is at least partially received and supported by the stem portion 248.

Figure 4:
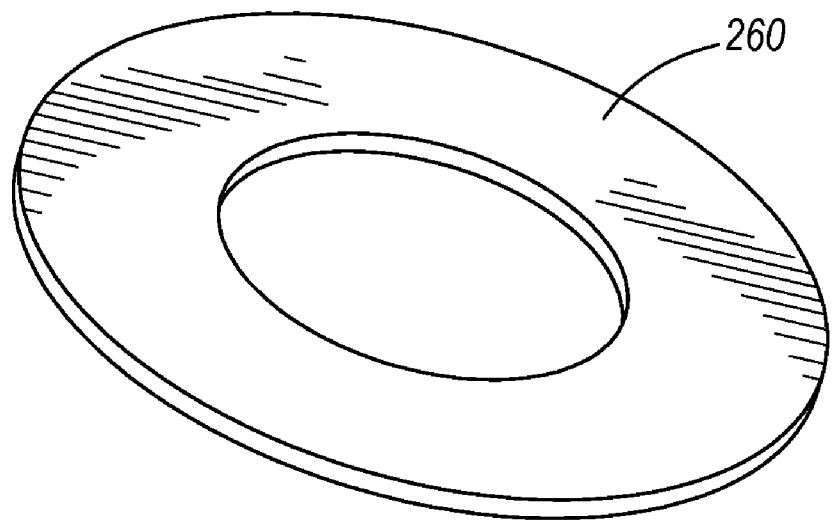
FIG. 4 is a perspective view of a ring configured to be used with the fitting of FIG. 3.
Figure 5:
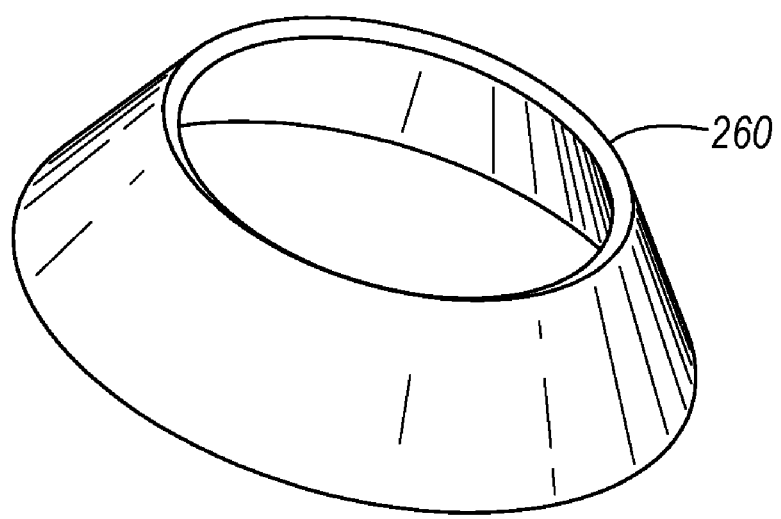
FIG. 5 is a perspective view of an alternate ring configured to be used with the fitting of FIG. 3.

A ring 260 is disposed between the nut 244 and the first conduit 224 to transfer load therebetween. The ring 260 is substantially coaxial with both the nut 244 and the first conduit 224. In the illustrated construction, the ring 260 is a washer having a conical shape to complement the tapered or conical interior surface 272 of the nut 244. The ring 260 may be constructed of copper, while the nut 244 may be constructed of steel. By establishing contact between the generally spherical-shaped exterior surface 232 and the ring 260 rather than the nut 244 directly, torque loss during nut tightening may be reduced. The net coefficient of friction that exists in the fitting 220 between the nut 244 and the first conduit 224 is influenced by the respective interfaces between the ring 260 and both the nut 244 and the first conduit 224. In a conventional fitting, the nut contacts the first conduit directly. In the illustrated construction, the ring 260 is configured to offer a lower net coefficient of friction between the nut 244 and the first conduit 224, compared to direct contact between the nut 244 and the first conduit 224. The effect of the reduced friction coefficient is an actual reduction in friction when the nut 244 is being tightened onto the second conduit 228. Therefore, the torque required to be applied to the nut 244 to achieve a particular axial sealing force is reduced. Alternately, a greater axial sealing force can be achieved with a given amount of torque applied to the nut 244. The ring 260 can be prefabricated as a flat washer (FIG. 4) and deformed to at least partially conform to the shape of the conical interior surface 272 of the nut 244. Alternately, the ring 260 can be prefabricated in a conical shape (FIG. 5) that complements the interior surface 272 of the nut 244.

Thus, the invention provides various improvements over conventional ball and cone type fittings. Although illustrated and described as three distinct constructions, the features of the invention may be combined in different combinations than those shown in the figures and described above. Various features and advantages of the invention are set forth in the following claims.

What is claimed is:

1. A fitting for making a metal-to-metal fluid seal, the fitting comprising:
   a first conduit defining a first fluid passage, the first conduit having a generally spherical-shaped exterior surface at a first end thereof;
   a second conduit defining a second fluid passage, the second conduit having a generally conical-shaped interior surface for receiving the generally spherical-shaped exterior surface of the first conduit, wherein the second conduit includes a threaded exterior surface;
   a nut engaged with the threaded exterior surface of the second conduit, tightening of the nut on the threaded exterior surface urging the first and second conduits axially together to apply increasing pressure between the generally spherical-shaped exterior surface and the generally conical-shaped interior surface; and
   a ring positioned between the first conduit and the nut, the ring having a radially facing outer surface that is radially spaced a distance from a radially facing inner surface of the nut,
   wherein the ring has a groove open to the outside of the fitting to provide a dedicated leak path for fluid inside the fitting but outside the first and second fluid passages to escape from the fitting at a predetermined location.

2. The fitting of claim 1, wherein the nut includes an internal axially facing surface, the ring contacting the nut solely at the internal axially facing surface.

3. The fitting of claim 1, wherein the generally spherical-shaped exterior surface includes a first portion for sealing with the generally conical-shaped interior surface and a second portion that is larger than the first portion.

4. The fitting of claim 1, wherein the net coefficient of friction between the nut and the first conduit during rotation of the nut relative to the first conduit is reduced by the presence of the ring, compared to direct contact between the nut and the first conduit.

* * * * *